(12) United States Patent
Santandrea

(10) Patent No.: US 10,864,695 B2
(45) Date of Patent: Dec. 15, 2020

(54) APPARATUS FOR COMPACTING WASTE OBJECTS

(71) Applicant: ATOP S.p.A., Florence (IT)

(72) Inventor: Marco Santandrea, Florence (IT)

(73) Assignee: ATOP S.p.A., Barberino Val d'Elsa, Italy ( * ) Notice: Subject to any disclaimer, the term of this patent is extended or adjusted under 35 U.S.C. 154(b) by 22 days.

(21) Appl. No.: 16/153,009

(22) Filed: Oct. 5, 2018

(65) Prior Publication Data

US 2019/0255793 A1    Aug. 22, 2019

Related U.S. Application Data

(60) Division of application No. 14/338,115, filed on Jul. 22, 2014, now Pat. No. 10,105,922, which is a
(Continued)

(30) Foreign Application Priority Data

| Sep. 25, 2008 | (IT) | .............................. PI2008A0098 |
| Sep. 25, 2008 | (IT) | .............................. PI2008A0099 |
| Sep. 25, 2008 | (IT) | .............................. PI2008A0100 |

(51) Int. Cl.
*B30B 9/32* (2006.01)
*B30B 15/32* (2006.01)
(Continued)

(52) U.S. Cl.
CPC .......... *B30B 9/321* (2013.01); *B29B 17/0047* (2013.01); *B30B 9/32* (2013.01);
(Continued)

(58) Field of Classification Search
CPC .. B30B 9/30; B30B 9/321; B30B 9/32; B30B 9/3014; B30B 15/32; B30B 15/34;
(Continued)

(56) References Cited

U.S. PATENT DOCUMENTS

| 2,638,957 | A | | 5/1953 | Danielson |
| 3,358,590 | A | * | 12/1967 | Howard ................ B30B 9/3014 100/218 |

(Continued)

FOREIGN PATENT DOCUMENTS

| DE | 20 08 519 | 2/1972 |
| DE | 86 08 743 | 5/1986 |

(Continued)

*Primary Examiner* — Jimmy T Nguyen
(74) *Attorney, Agent, or Firm* — Haley Guiliano LLP; Jeffrey H. Ingerman; Jason S. Ingerman

(57) ABSTRACT

An apparatus for compacting waste objects includes a seat provided with a support assembly for supporting the waste object to be compacted; a push member being moveable inside the seat for compacting in use of the apparatus the waste object against an end wall of the seat; the support assembly including two support members that rotate away from each other for discharging the compacted object through an aperture. The support members can impede discharge of a compacted object of a specific type through the aperture to collect the compacted object of the specific type in a dedicated container. Protuberances can be applied to the push member and an end wall of the seat for producing depressions in the compacted object so that the compacted object does not lose the compacted condition once pressure applied by the push member is removed.

12 Claims, 11 Drawing Sheets

Related U.S. Application Data continuation of application No. 13/119,653, filed as application No. PCT/EP2009/006903 on Sep. 24, 2009, now Pat. No. 8,813,643.

(51) Int. Cl.
  *B29B 17/00* (2006.01)
  *B30B 15/34* (2006.01)
  *B29L 31/00* (2006.01)

(52) U.S. Cl.
  CPC ............ *B30B 15/32* (2013.01); *B30B 15/34* (2013.01); *B29L 2031/772* (2013.01); *Y10S 100/902* (2013.01)

(58) Field of Classification Search
  CPC ......... B65F 1/10; B65F 1/14; B29B 17/0047; B29L 2031/772; A47B 77/18; Y10S 100/902
  USPC ............ 100/218, 226, 229 A, 240, 245, 902
  See application file for complete search history.

(56) References Cited

U.S. PATENT DOCUMENTS

| | | | |
|---|---|---|---|
| 3,460,463 A * | 8/1969 | Jernstrom | B30B 1/18 100/52 |
| 3,768,398 A | 10/1973 | Ullman | |
| 4,064,798 A | 12/1977 | Wolbrink et al. | |
| 4,213,384 A | 7/1980 | Telling | |
| 4,269,114 A | 5/1981 | Schwarz | |
| 4,518,142 A * | 5/1985 | Sulcek | A47B 91/02 248/188.2 |
| 5,465,660 A | 11/1995 | Conti et al. | |
| 5,858,235 A | 1/1999 | Nagaoka | |
| 6,138,558 A | 10/2000 | Harrington | |
| 7,874,247 B2 | 1/2011 | Wideall | |
| 8,813,643 B2 | 8/2014 | Santandrea | |
| 10,105,922 B2 * | 10/2018 | Santandrea | B30B 9/32 |
| 2003/0057144 A1 | 3/2003 | Wang | |

FOREIGN PATENT DOCUMENTS

| | | |
|---|---|---|
| DE | 197 09 858 | 9/1998 |
| DE | 101 30 006 | 2/2003 |
| DE | 103 48 009 | 5/2005 |
| EP | 0 568 423 | 11/1993 |
| EP | 1 707 345 | 10/2006 |
| EP | 2 070 691 | 6/2009 |
| GB | 2447612 | 9/2008 |
| JP | 8 066796 | 3/1996 |
| JP | 9-24495 | 1/1997 |
| JP | 9 155303 | 6/1997 |
| JP | 10 156589 | 6/1998 |
| JP | 11-104892 | 4/1999 |
| JP | 2000 312994 | 11/2000 |
| JP | 2001-058171 | 3/2001 |
| JP | 2001-259894 | 9/2001 |
| WO | WO 81/02802 | 10/1981 |
| WO | WO 02/102580 | 12/2002 |
| WO | WO 2008/000510 | 1/2008 |

\* cited by examiner

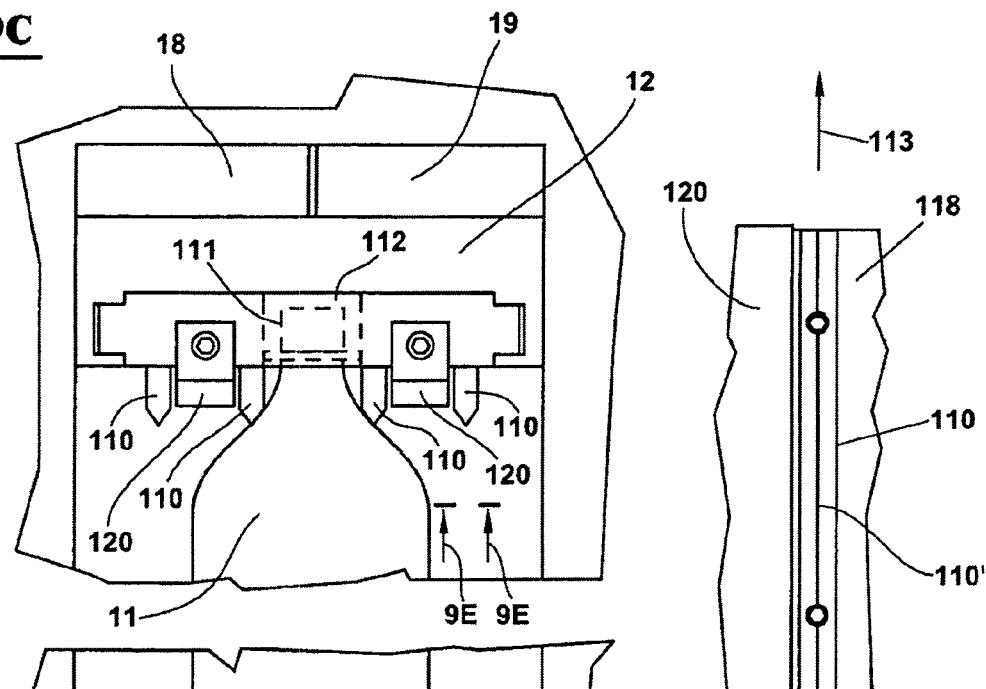
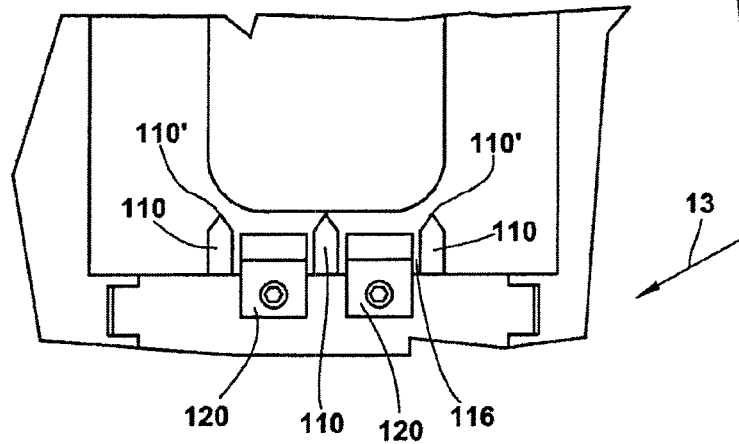
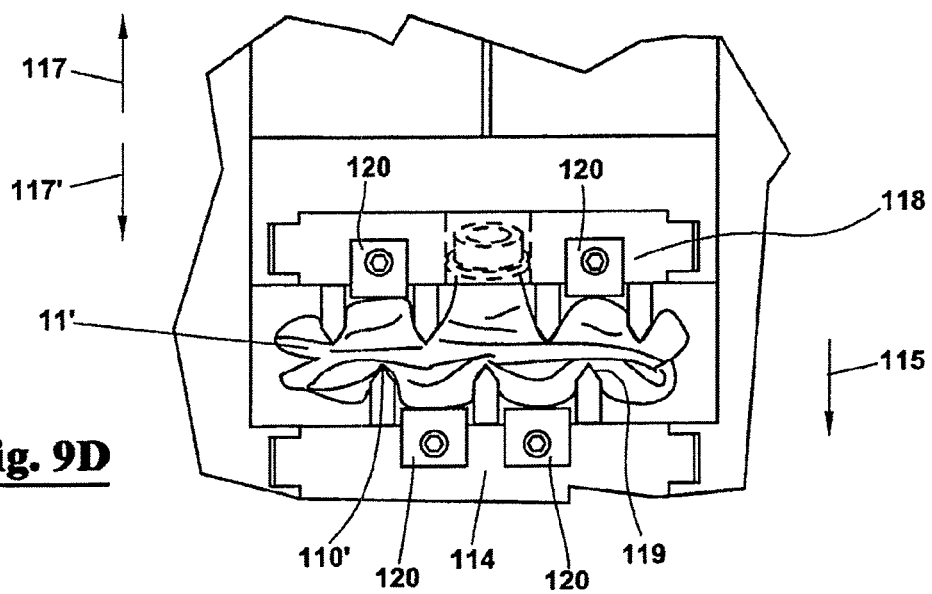
Fig. 9C
Fig. 9E
Fig. 9D

APPARATUS FOR COMPACTING WASTE OBJECTS

CROSS-REFERENCE TO RELATED APPLICATIONS

This is a division of U.S. patent application Ser. No. 14/338,115, filed Jul. 22, 2014 (now U.S. Pat. No. 10,105,922), which is a continuation of U.S. patent application Ser. No. 13/119,653, filed Mar. 17, 2011 (now U.S. Pat. No. 8,813,643) as the United States National Stage of International Patent Application No. PCT/EP2009/006903, filed Sep. 24, 2009, each of which is hereby incorporated herein by reference in its respective entirety.

FIELD OF THE INVENTION

The present invention relates to waste compacting devices, and in particular to devices that are appropriate for kitchen environments, where it is desirable to compact waste objects like plastic and metal containers, for example plastic bottles and tin or aluminum cans.

BACKGROUND OF THE INVENTION

A particular requirement in such devices is that of separately compacting the various objects depending on the type of object that needs to be compacted, and then separately collecting the various types of compacted objects.

During the compacting operation, the objects are compressed to occupy less space and separately collected, for example each type of waste is collected in a specific container.

The cycle of compaction and separate collection becomes necessary and vital in the treatment of waste produced by a population.

Treating of waste for its reuse requires separate collection and increased optimization of the management of the waste produced in the domestic environment and other areas.

Consequently there is an increasing requirement of compacting a greater number of types of waste and separately collecting them when they have been compacted.

EP 1707345 describes a waste compacting unit capable of separately compacting different objects like plastic containers and metal containers, and separately collecting these objects after compacting. More particularly, each type of object can be compacted with an appropriate compression cycle in a compacting chamber that is dedicated to a type of waste. Successively, the compacted objects are discharged into specific containers, which have been aligned with an assigned compacting chamber.

The height of the space occupied by the compacting chamber and the lower collection containers notably influences the accommodation of the compacting device in required locations. In fact, the height of this space becomes relevant in those devices of reduced height, for example devices with height less than 50 cm, which need to be located under washing basins of kitchen units or in other locations where the available height is limited.

The bottom surfaces of the compacting chamber support the objects during the compacting operation, and are opened during, or after, the final stage of the compression, to allow the compacted objects to fall into the respective collecting containers.

The bottom surfaces can be portions of hinged structures that rotate to be opened so that the compacted object falls into a container. The hinged structures when rotating occupy space which is above or within the collecting container. The height of this space becomes particularly relevant when designing the size of the waste compacting unit. This space influences the above mentioned space for accommodation of the compacting device in required locations. In some cases the waste compacting unit also needs to be adjacent to waste grinding units like those described in WO2008000510, therefore also the width of the compacting device should not be considerably influenced by the solution for supporting the objects to be compacted.

In addition, solutions are required for assisting and optimizing loading of the object to be compacted by a user.

SUMMARY OF THE INVENTION

It is an object of the invention to provide waste compacting devices which occupy less space in height in the position where the waste compacting devices need to be located to operate.

It is also an object of the invention to provide waste compacting devices which occupy less space in width in the position where waste compacting units need to be located to operate.

It is another object of the invention to provide compacting devices in which loading of the object to be compacted by the user is facilitated and optimized.

It is yet an object of the invention to provide compacting devices in which removal of the compacted objects from the devices by the user is facilitated and optimized.

It is a further object of the invention to provide waste compacting units that are equipped with support assemblies in the compacting chambers for supporting the waste objects during the compacting operation in which support members can be opened to discharge the compacted objects and occupy less space during their motion for opening.

It is also an object of the invention to provide waste compacting devices equipped with supporting structures in the compacting chambers for supporting the objects during the compacting operation, in which the support assemblies can be rapidly and accurately moved during the opening motion to discharge the compacted objects.

It is another object of the invention to provide a compacting device that is able to compact a greater number of types of waste and separately collect the various types of compacted waste.

It is also an object of the invention to provide a compacting device that is able to compact a greater number of types of waste and occupies minimum space in height where the device is located.

These and other objects are accomplished with a compacting apparatus according to an embodiment of the invention comprising:
  a seat having end walls;
  a support assembly for supporting a waste object to be compacted in the seat;
  a push member that is moveable inside the seat for compacting in use of the apparatus the waste object against an end wall of the seat;
  wherein the support assembly is moveable from a support position, for supporting the waste object, to a discharge position for discharging a compacted object;
  wherein the support assembly when moving to said discharge position forms an aperture for discharging the compacted object;
  wherein the support assembly comprises two support members that are adapted to rotate away from each other for discharging the compacted object;

wherein the aperture is formed between edges of the two support members when rotating away from each other; and wherein the support members have a curvilinear concave profile that faces the seat and at least partially encircles the waste object that in use of the apparatus is supported within the seat.

A support member can comprise a support surface and at least one arm for connecting the support surface to a rotation centre of the support member; the arm can be hinged to the structure of the seat for rotating the support member.

One of the support member can be driven by a motor to rotate around a rotation centre, whilst the other support member can rotate around a further rotation centre and be moved by the motion of the first support member.

Movement of the push member can cause the support members to rotate around respective rotation centers when the push member moves within the seat for compacting a waste object; the rotation of the support members can be derived from engagement of an assembly of the push member with a cam surface of a support member.

A waste compacting device can be moved between a position where the objects to be compacted can be loaded from a vertical direction and a position where the waste compacting device becomes operative to carry out the compacting operation and discharge the compacted objects.

An air duct can be positioned above the seat to supply heated air around an object to be compacted. The heated air improves the compacting operation, whilst the support members contribute to convey the heated air around the object.

According to a further embodiment of the invention there is provided an apparatus for compacting waste objects comprising:
 a seat that is defined by end walls for containing a waste object to be compacted;
 a support assembly of the seat, the support assembly adapted to support a waste object to be compacted;
 a frame having support means for supporting the seat;
 a push member that is moveable inside the seat for compacting in use of the apparatus the waste object against an end wall of the seat;
 a means for moving the seat on the support means of the seat from a first position that is totally or partially extracted from the frame, such that in use of the apparatus the waste object to be compacted is placed in the seat when the seat is in said first position, to a second position where in use of the apparatus compacting of the object occurs;
 a collection container for receiving a compacted object from the seat,
 and wherein the means for supporting the seat support the seat and the collection container aligned together as a unit, said means for moving adapted to move said seat and collection container as a unit from the first position to the second position.

Preferably the seat is adapted to receive the waste object to be compacted in a vertical direction when the seat is in the first position.

Preferably the means for supporting the seat comprises a fixed structure for supporting the seat and a moveable supporting portion; the means for moving the seat comprises a guide means that is arranged between the frame of the device and the moveable supporting portion.

According to a further embodiment of the invention there is provided an apparatus for compacting waste objects of at least a first type and a second type comprising:
 a seat provided with an entrance for introducing an object to be compacted;
 a support assembly for supporting the waste object to be compacted;
 a push member that is moveable inside the seat for compacting in use of the apparatus the waste object to be compacted; wherein the support assembly is moveable from a position for supporting the object during compacting to a position for discharging an object of the first type.
 and wherein an aperture is formed by the movement of the support assembly for the passage of the compacted object of the first type during discharging;
 means for impeding the discharge of a compacted object of a second type through the aperture;
 means for collecting compacted objects of the second type.

Preferably the means for impeding comprise support members of the support assembly; an actuator for moving the support members and a control system for the actuator Preferably the means for collecting compacted objects of the second type are adjacent to the support assembly.

Preferably the means for impeding comprises support members of the support assembly, an actuator for the movement of the support members and a control system of the actuator.

Preferably, the seat extends above at least two collection containers of the compacted objects, wherein a first collection container is aligned with a portion of the length of the seat adjacent a first end wall of the seat for collecting compacted objects of the first type and a second collection container is aligned with a portion of the length of the seat adjacent a second end wall of the seat for collecting compacted objects of a third type Preferably, means are provided for moving the seat from a first position in which an object to be compacted is loaded in the seat to a second position in which the object of the first type is compacted. Preferably the object of the second type is compacted with the seat in the first position.

According to an embodiment of the invention which optimizes the compacting result, protuberances can be applied to the push member and an end wall of the seat for producing depressions in the compacted object; the protuberances having a major extension dimension in a direction that is parallel to a plane that is perpendicular to the direction for moving the push member to compact the waste objects

BRIEF DESCRIPTION OF THE DRAWINGS

The invention will now be described with reference to the following description relating to exemplary embodiments thereof, which are exemplifying but not limitative, and with reference to the accompanying drawings, wherein:

In FIG. 2 certain parts have been omitted for reasons of clarity;

FIG. 4 shows a seat of the compacting chamber with an object to be compacted positioned therein. In FIG. 4 certain parts have been omitted for reasons of clarity;

FIG. 6 also illustrates a mechanism for moving the support members from a closed position to an open position; the open position is used for the discharge of the compacted object;

FIGS. 9C and 9D are two schematic representations in plan views similar to the plan views of FIGS. 9A and 9B illustrating a further embodiment for improving compacting of an object;

FIG. 9E is a partial view as seen from directions 9E-9E of FIG. 9C.

DESCRIPTION OF THE PREFERRED EMBODIMENTS

Figure 1:
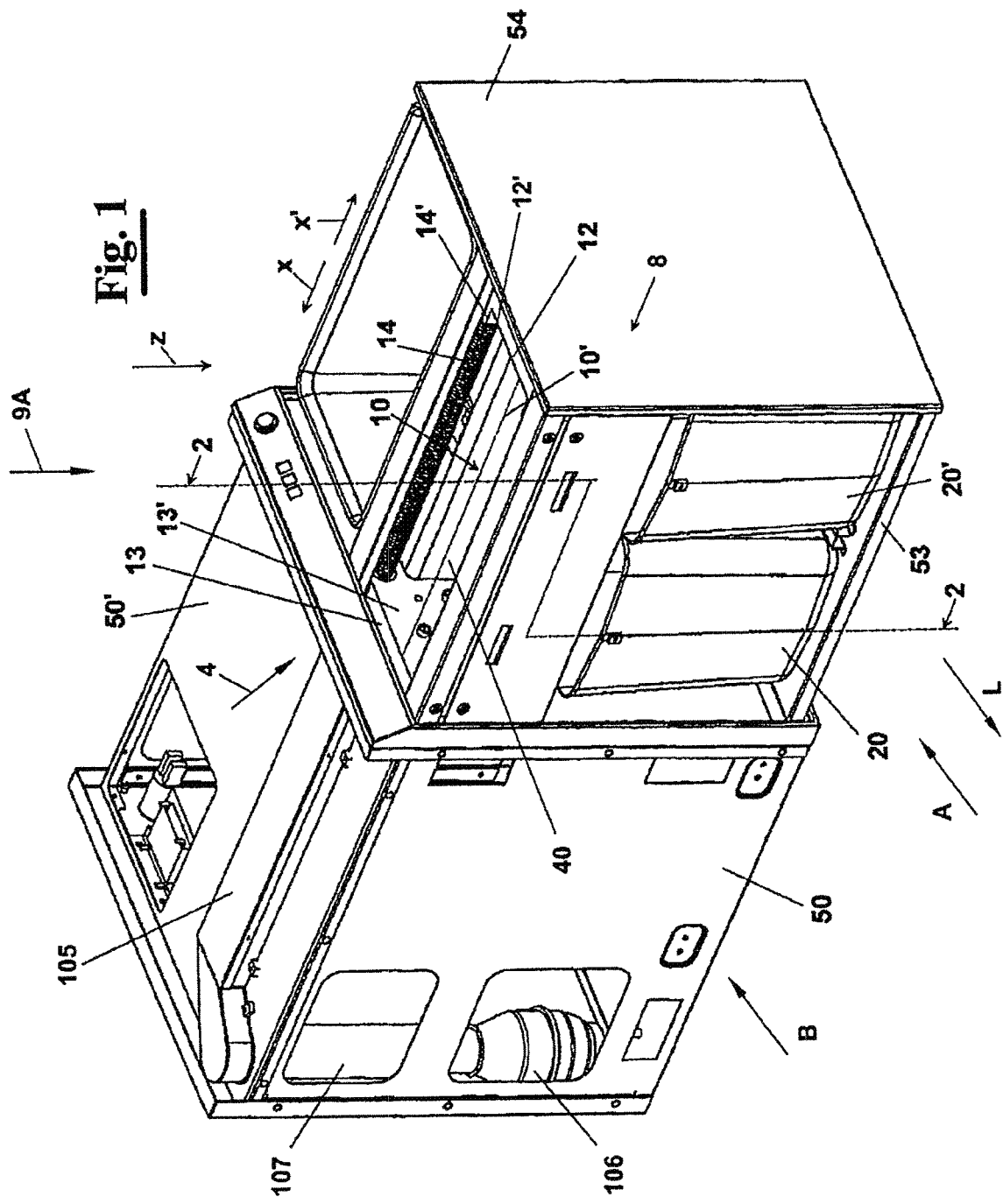
FIG. 1 is a prospective view of a unit provided with a device for compacting according to the invention. The unit can be located in a kitchen environment and in a position like the space under the washing basin.
Figure 2:
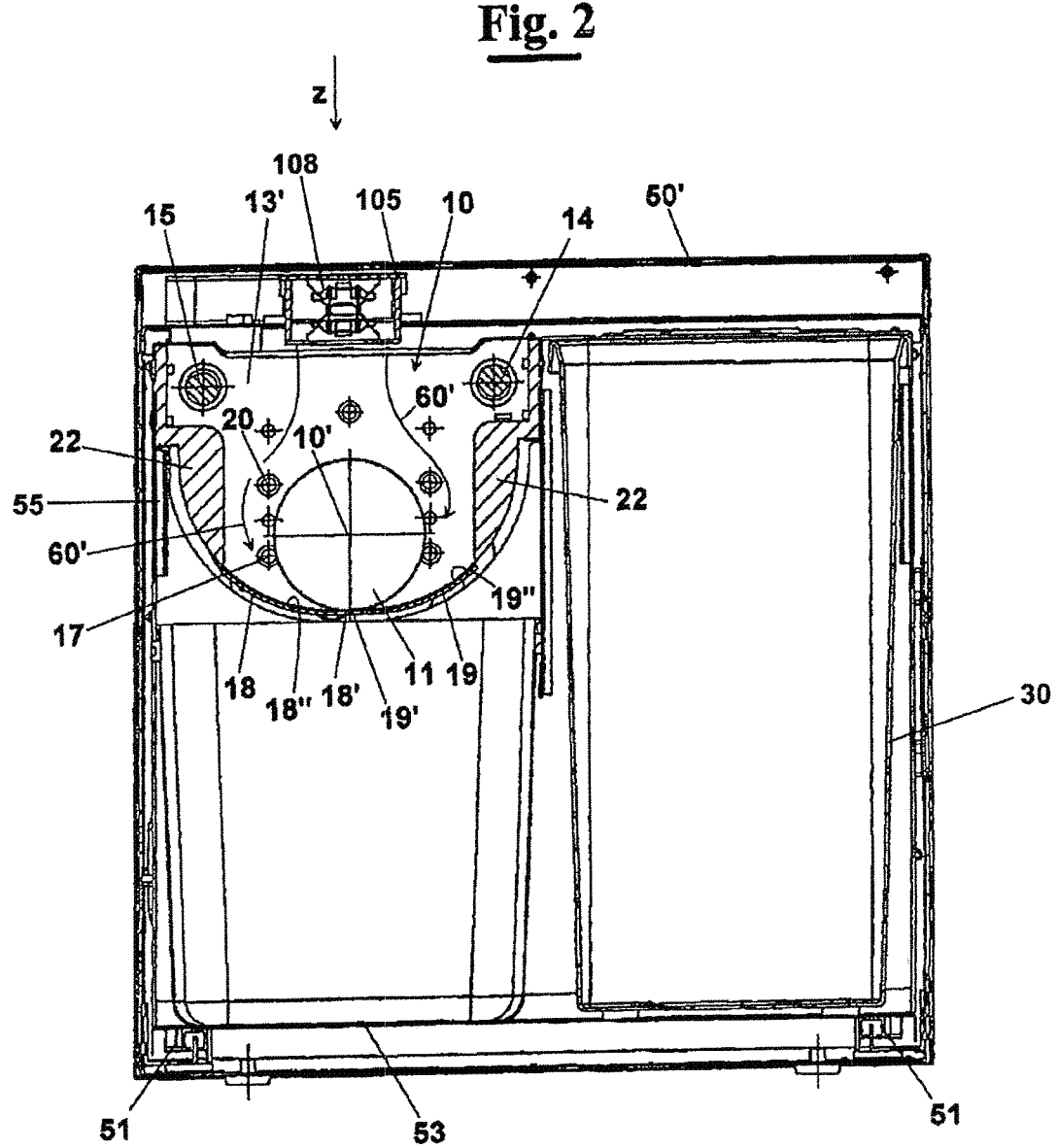
FIG. 2 is a section view from directions 2-2 of FIG. 1 illustrating the spacing of a compacting chamber with an object positioned for compacting. A collection container for collecting the compacted object is also shown.
Figure 3:
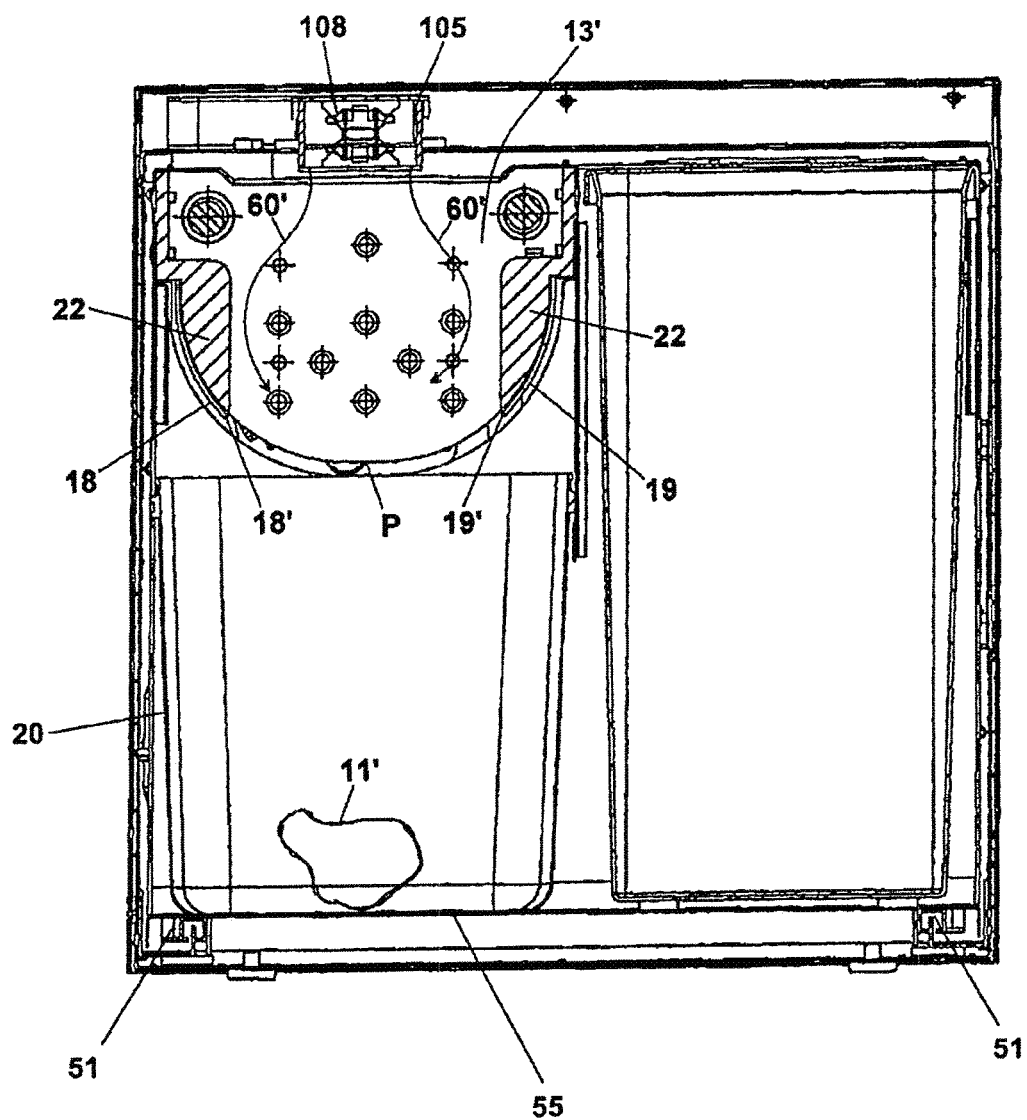
FIG. 3 is a view similar to the view of FIG. 2 illustrating the compacting device in a condition where the object shown in FIG. 2 has been compacted and discharged in a collection container.
Figure 4:
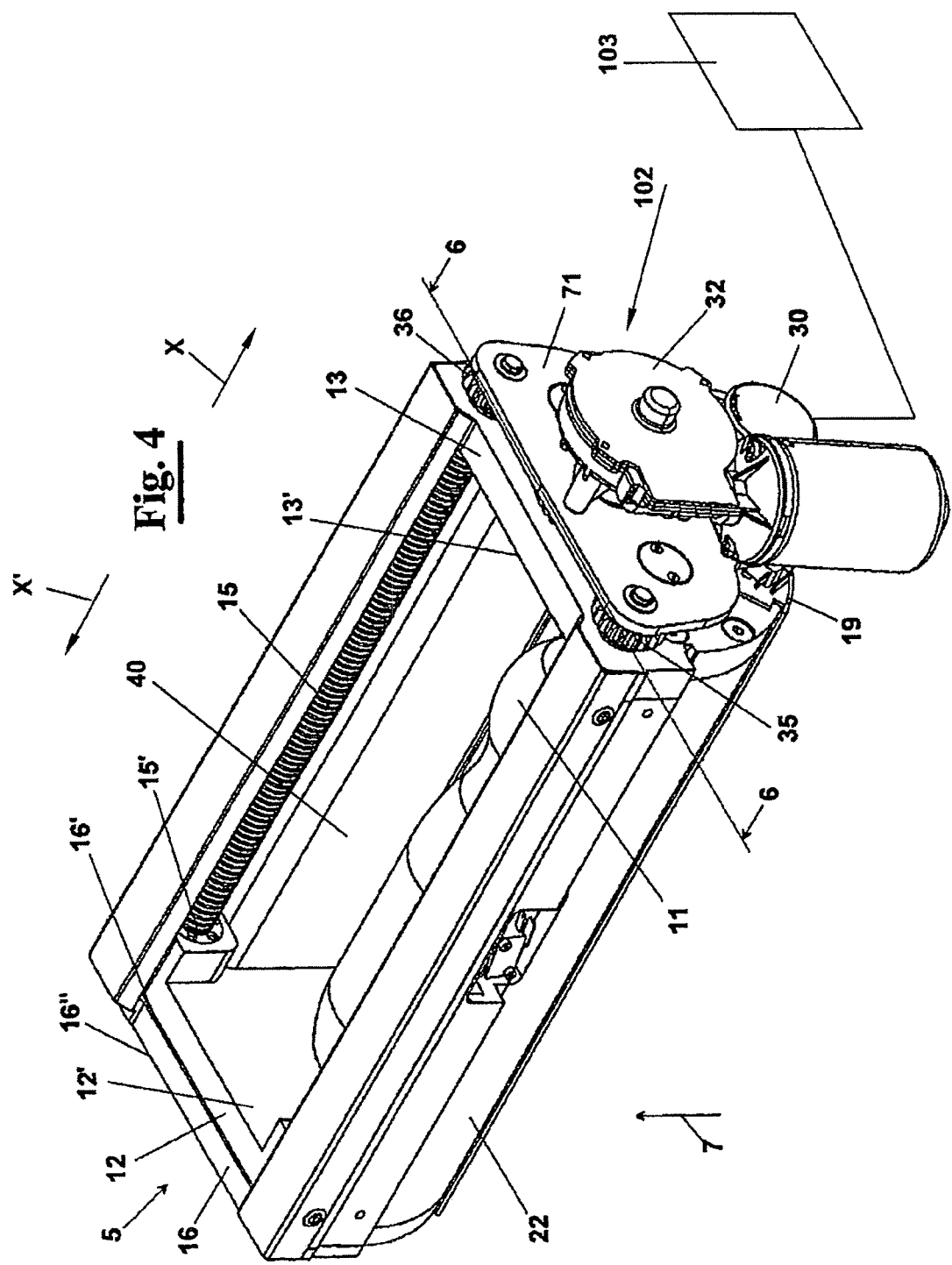
FIG. 4 is a prospective view as seen from direction 4 of FIG. 1 of a portion of the compacting device.

With reference to FIGS. 1, 2, 3, 4 and 9 the compacting device comprises a seat 10 where an object 11 to be compacted is positioned by the user. In particular, FIGS. 2 and 4 illustrate object 11 in seat 10 ready to be compacted. Object 11 has been introduced in seat 10 through an entrance opening 40.

As shown in FIGS. 1 and 4, seat 10 is horizontally delimited by a surface 12' of a push member 12 and by a surface 13' of an end wall 13. Push member 12 can be translated in directions X and X' by rotation of screws 14 and 15. More particularly, screw 15 results hidden in FIG. 1, although it is visible in FIG. 4. Screws 14 and 15 are on the sides of seat 10 and engage respective threaded bushes 14' and 15', which are integral with push member 12 for translating the push member in the directions X and X'.

Rotation of the screws can occur by means of a motor and reduction gear assembly 102, as illustrated in FIG. 4, that rotates a gear transmission (hidden by a plate 71), which is connected to screws 14 and 15.

The translation in direction X causes push member 12 to compress an object like a plastic bottle 11 as illustrated in FIGS. 2 and 4, against surface 13' of wall 13 (see FIG. 1).

A translation in the opposite direction X' returns the push member to the rest position as illustrated in FIGS. 1 and 4.

Furthermore, the translation in direction X' of push member 12 can be used to compress another object, like a metal can, against surface 16' of wall 16. Therefore seat 10 can be delimited also by end wall 16 when push member 12 pushes a metal can against surface 16'.

The object to be compacted 11 is supported by a support assembly comprising support members 18 and 19 (see also FIGS. 2 and 3) during the compacting operation by push member 12 against end wall 13' or 16'.

Figure 6:
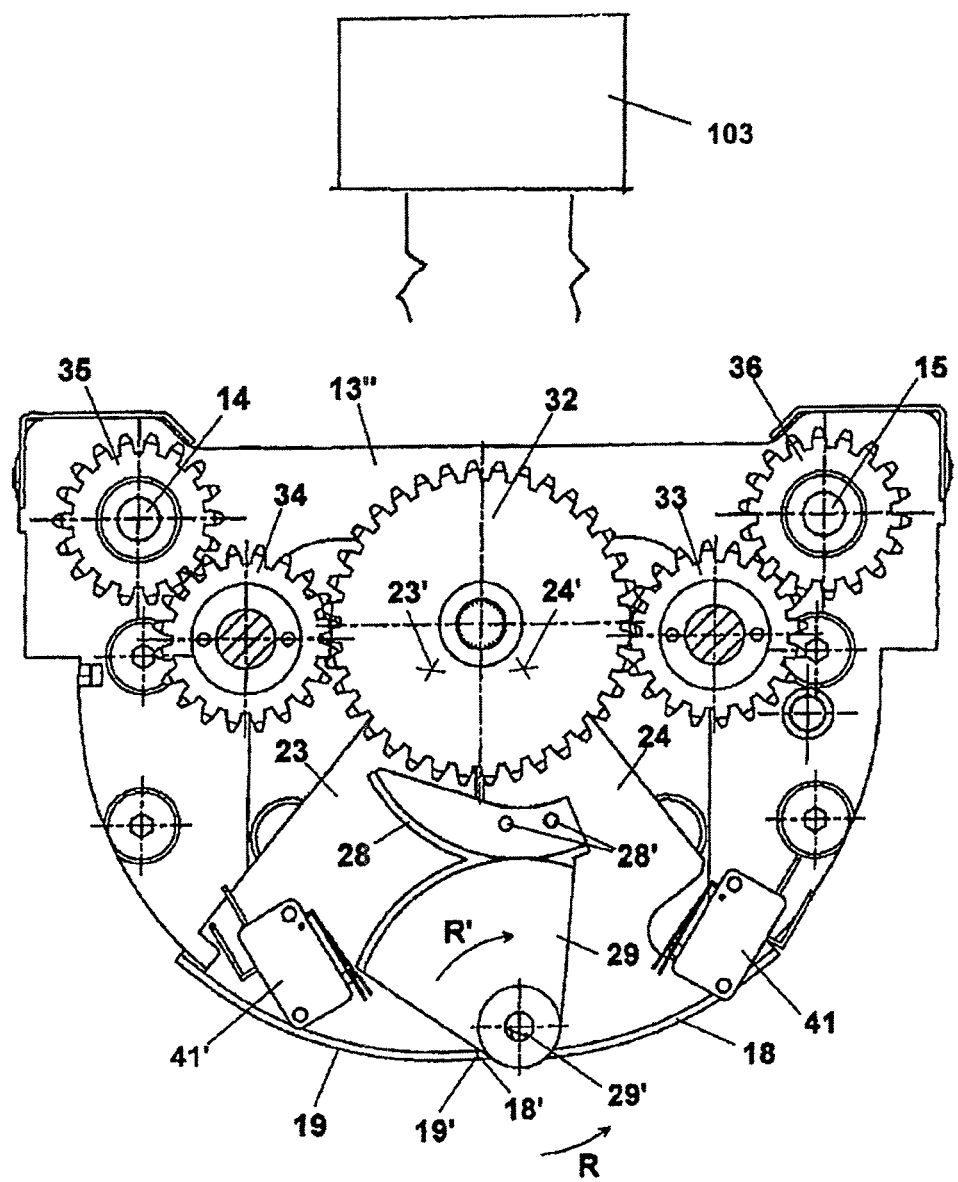
FIG. 6 is a partial section view of a portion of the compacting device as seen from direction 6-6 of FIG. 4 illustrating two support member according to the invention in a closed position for supporting the waste object to be compacted.

In particular, support members 18 and 19 have respective edges 18' and 19', which are adjacent to each other in the closed position to support an object, as shown in FIGS. 2 and 6.

The object that needs to be compacted can be positioned in seat 10 with its major dimension positioned approximately parallel to axis 10' in seat 10, see the example of the plastic bottle 11 of FIGS. 2 and 4. Support members 18 and 19 of the support assembly can be moved for being opened and therefore increase a distance that separate edges 18' and 19'. The increase of the distance between edges 18' forms aperture P that opens below a compacted object 11', as shown in FIG. 3. Compacted object 11' can therefore fall by gravity through aperture P when push member 12 moves in direction X' or X to return to the rest position. Compacted object 11' falls in a specific container, referenced like 20 or 20', which is aligned under the portion of the length of seat 10 that is adjacent to where compacting has occurred with push member 12. In the case of the bottle shown in FIGS. 2 and 4, the compacted object 11' falls into container 20 because the compacting has occurred against surface 13' (see FIGS. 1, 3 and 9).

Figure 9:
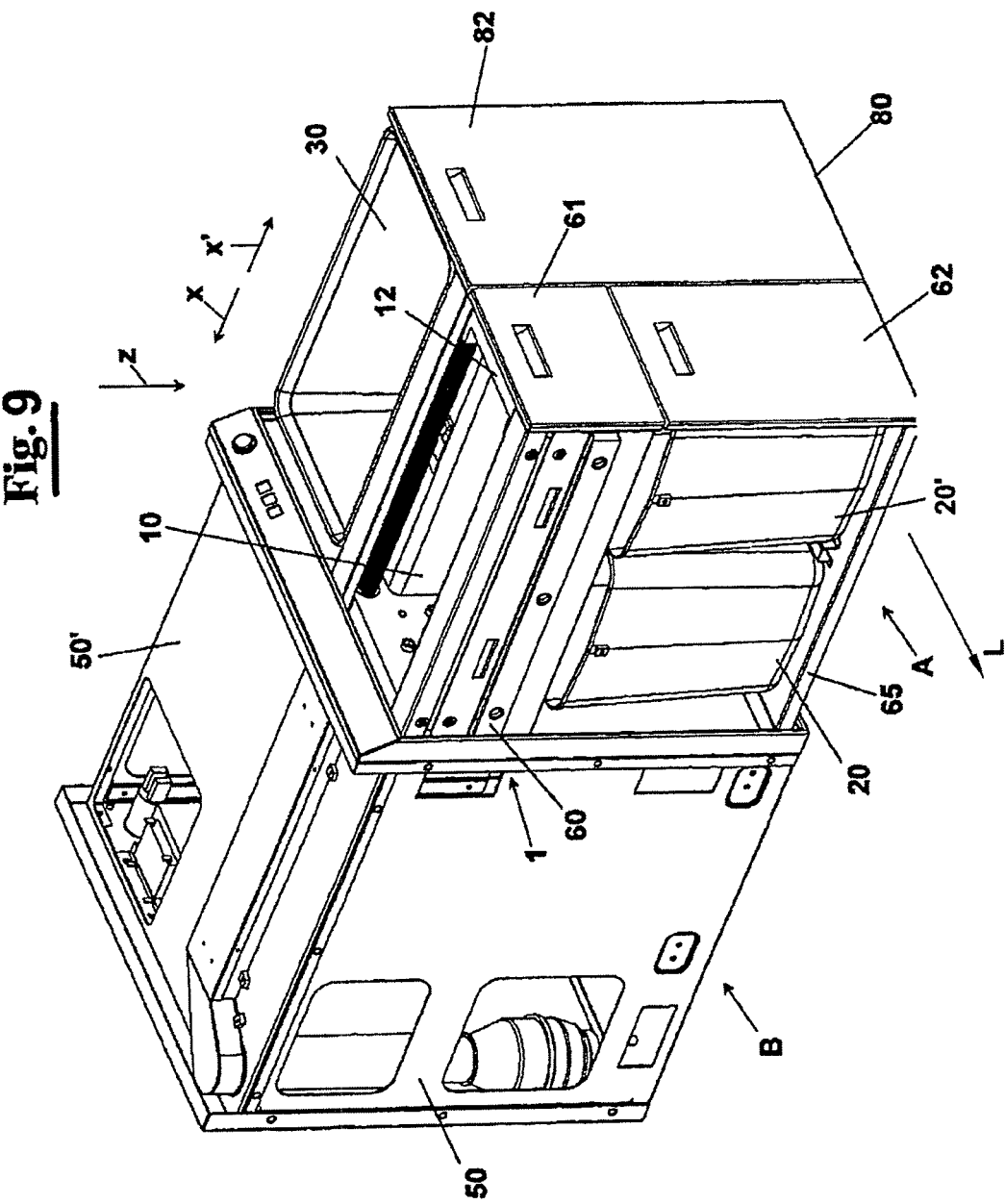
FIG. 9 is a prospective view similar to FIG. 1 illustrating an alternative embodiment of the invention.

For an object of a second type, like a metal can which has been compacted by the translation of member 12 in opposite direction X', therefore with a pressing action against surface 16' of the end wall 16 (see FIG. 4), the compacted object can fall through aperture P into second collection container 20', which is aligned under the second portion of the length of seat 10 adjacently to surface 16' (see FIGS. 1 and 9).

The user can position the object into seat 10 from an upper position to a lower position (see direction Z), as shown in FIGS. 1, 2 and 9. To perform this loading step of the object, the compacting device together with collection containers 20 and 20' are brought to position A, as illustrated in FIGS. 1 and 9, by moving them in direction X'. In position A, the compacting device together with collection containers 20 and 20' are completely or partially outside of frame 50 of the units shown in FIGS. 1 and 9. In this way, access to seat 10 is facilitated along direction Z and though opening 40 to load the object into seat 10, as described above. Furthermore, the collection containers 20 and 20' are easily extracted laterally in direction L when they need to be emptied, as shown in FIGS. 1 and 9.

The compacting device and containers 20 and 20' can be assembled on a carriage 53 by means of a supporting and connecting structure 55 (see FIGS. 1 and 2), therefore the compacting device and container 20 and 20' can form a unit that is assembled on carriage 53. Carriage 53 can slide on guides 51 of frame 50 (see FIGS. 1 and 2) for translation in directions X and X'. In this way the compacting device together with containers 20 and 20' can be translated together in direction X' to reach a position A where they are outside frame 50. The translation in the opposite direction X returns the compacting device and the containers 20 and 20' to the internal position B of frame 50, where the compression and discharge of compacted objects into container 20 or 20' occurs. In the solution of FIG. 1 the user pulls or pushes carriage 53 by acting on front panel 54 to move carriage 53 respectively in directions X' or X.

The upper portion 50' of frame 50 can be positioned below a kitchen basin. In this situation the solution described above for extracting the compacting device in direction X' to position A makes it possible to load seat from the above without interfering with overhead structures.

The surface 13' of wall 13 is provided with device 17 (see FIG. 2) to puncture the object as it becomes compacted in order to allow accumulated air to exit, as has been described in EP 1707345.

Each device 17 comprises a pin with a pointed end for puncturing the object 11. The pin is surrounded by a cylindrical edge fixed to surface 13'. The pins are able to pass through surface 13' and are carried by springs (not shown).

Figure 9A:
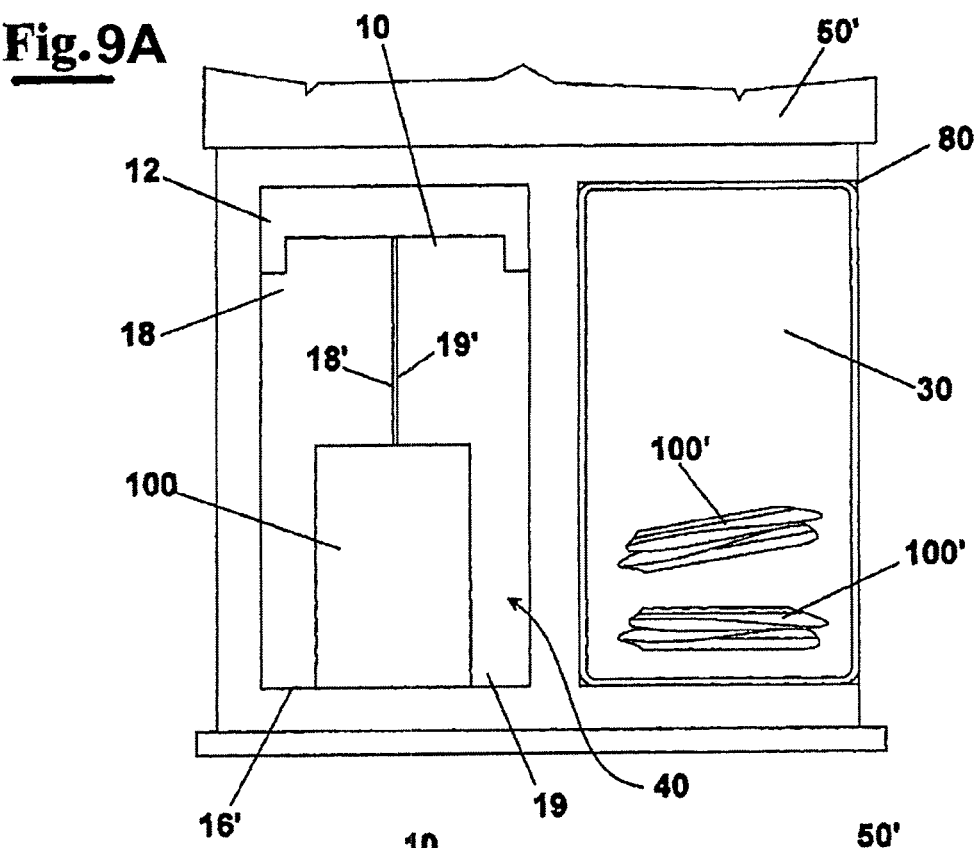
FIGS. 9A and 9B are two schematic representations in a plan view as can be seen from direction 9A of FIG. 1 illustrating the stages of compacting of an object respectively before and after compacting an object.
Figure 9B:
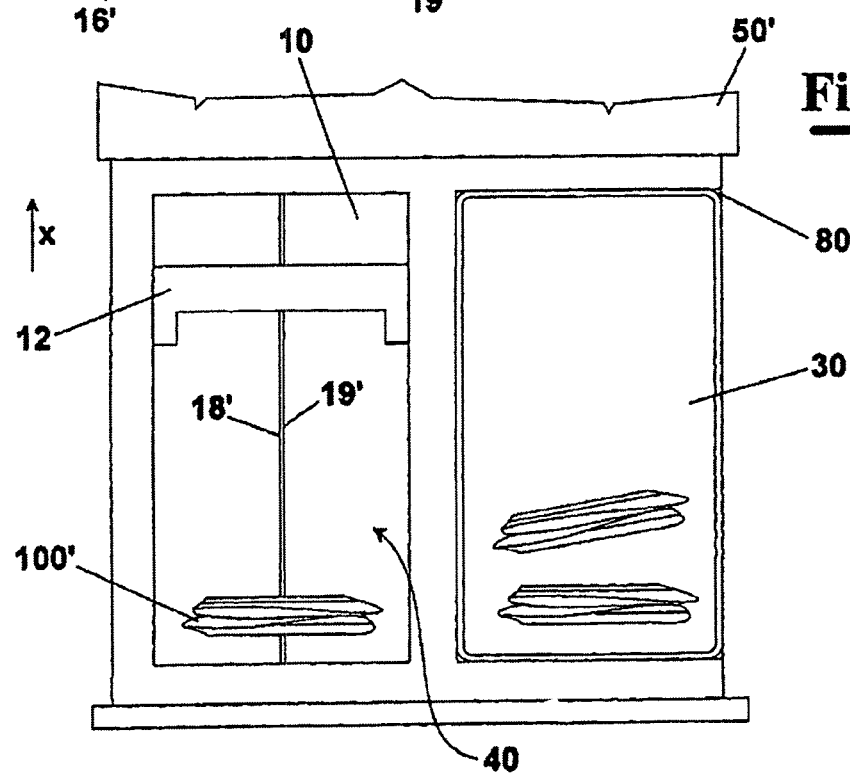

For an additional type of object that needs to be compacted, like a carton box 100 (see FIGS. 9A and 9B), the user can position this object 100 in the compacting space exiting between push member 12 and the end wall 16'. Successively the motor and reduction gear 102 can be activated for moving member 12 to cause the compacting cycle of the object 100 against surface 16'. During and after compacting of object 100, the support members 18 and 19 remain with edges 18' and 19' closed (see FIG. 9B), therefore the compacted object 100' remains supported by support members 18 and 19 of seat 10 without being discharged in container 20', which is aligned under the second portion of the length of seat 10 adjacent to surface 16'.

Impeding discharge of object 100' is achieved by foreseeing a functioning cycle in which motor 30 for opening support members 18 and 19 after compacting of object 100 is not activated by controls 103 of the compacting device (see FIG. 4).

After compacting object 100, push member 12 is moved by activating the motor and reduction gear 102 to move in direction X (see FIG. 9B) and then push member 12 returns to a position which removes pressure on the compacted object (see compacted form 100' of the object).

This leaves enough space for the user to grasp object 100' and transfer it manually to container 30. Container 30 can be specific for compacted carton objects and will therefore result positioned on one side of seat 10 after compacting.

Transfer of the compacted carton objects 100' to container 30 can occur with manual lifting of the object 100' from seat 100, by passing through entrance 40 followed by lateral translation of object 100' for the alignment with container 30. After this alignment, object 100' can be allowed to drop or be accompanied into container 30.

To perform the loading condition of object 100', the compacting device is brought to the position A illustrated in FIGS. 1 and 9, by moving the compacting device in direction X'. In position A the compacting device together with the collection containers 20, 20' and 30 are outside frame 50 of the units shown in FIGS. 1 and 9. In this way access to seat 10 is facilitated along direction Z to load the carton object 100 and for unloading object 100' through entrance 40, as described above. Furthermore, the collection containers 20, 20' and 30 can be easily extracted laterally in direction L when they need to emptied, as shown in FIGS. 1 and 9.

The compacting device and the containers 20, 20' and 30 can be assembled on carriage 53 by means of supporting and connection structure 55 (see FIGS. 1 and 2), therefore the compacting device with containers 20, 20' and 30 can form a unit which can be translated in directions X and X' by means of carriage 53.

In particular, the translation of carriage 53 in direction X returns the compacting device and the containers 20, 20' and 30 to internal position B of frame 50, where the compression and discharge of the compacted objects in container 20 and 20' can occur, whilst the translation of carriage 53 in opposite direction X' returns the compacting device with containers 20, 20' and 30 to the extracted position A outside of frame 50, where in general the objects can be loaded to be compacted in seat 10, compacting of objects like carton 100 and unloading of the carton type of compacted objects in their respective container 30.

In the solution of FIG. 9 the compacting device can be assembled on guides 60 positioned on each side of the longitudinal part of seat 10. The guides are moveable on supports located inside frame 50, and guides 60 allow the compacting device to be moved in directions X and X' to reach positions A or B without moving containers 20, 20' and 30. In the extracted position A loading can occur of any type of object, whilst in position B compacting occurs of those objects which need to be discharged into containers 20 and 20'. In the extracted position A, the steps of compacting those objects of an additional type like carton 100 and of discharging this type of objects into container 30 when they have been compacted.

In the solution of FIG. 9, a user pulls a front panel 61 of the compacting device in direction X' to reach extracted position A or pushes front panel 61 to move the compacting device in direction X to reach internal position B.

Still within the solution of FIG. 9, the containers 20 and 20' are assembled on a separate carriage 65 to reach extracted position A or internal position B.

In the extracted position A the collection containers 20, 20' can be easily removed from carriage 65 with a lateral movement in direction L when they need to be unloaded.

The user can push front panel 62 to move carriage 65 in direction X to reach position B or the user pulls front panel 62 to move carriage 65 in direction X' to reach position A.

Furthermore, in the solution of FIG. 9 container 30 can be assembled on a separate carriage 80 to reach the extracted position A or the internal position B.

The user pulls the front panel 82 to move carriage 80 in direction X' to reach extracted position A or pushes the front panel 82 to move carriage 80 to move in direction X to reach internal position B.

In both the solutions of FIGS. 1 and 9, the upper part 50' of frame 50 can be placed below washing basins of kitchens. In this situation, the solution described above of extracting the compacting device in direction X' up to the extracted position A allows loading seat 10 from above and transfer of object 100' to container 30 without interference with overhead structure.

As shown in FIGS. 2 and 3, the edges 18' and 19' of the support members 18 and 19 are moved above the aperture P which is being formed under the object that has been compacted in seat 10.

Furthermore, edges 18' and 19' and all the other portions which form members 18 and 19 are positioned laterally with respect to seat 10 and to the aperture P which is being formed. In fact, the support members 18 and in being separated to form the aperture P move laterally to become adjacent to side walls 22 which delimit seat 10.

Members 18 and 19 are provided, respectively, with curvilinear surfaces 18" and 19" for supporting objects like 11. The concavity of surfaces 18" and 19" face seat (see FIGS. 2, 3, 4, and 5). In this way, members 18 and 19 in the closed position partially surround, or totally surround, the object to be compacted depending on the size of the object to be compacted.

The height of the space occupied by members 18 and 19 in being opened and closed can be above aperture P, which is progressively formed and can be contained in the same height occupied by the lateral walls 22 of seat 10 (see FIGS. 2 and 3). Based on this characteristic, the height of the space required for opening and closing members 18 and 19 is negligible in terms of additional height that is required for locating the compacting device in its operation position.

Furthermore, the fact that members 18 and 19 become positioned adjacent to the lateral walls 22 which delimit seat 10 (see FIG. 3) and the fact that members 18 and 19 have a form and thickness which occupy minimum space next to side walls 22, bring the advantage of having a reduced width (dimension perpendicular to the longitudinal axis 10') of the compacting device.

Figure 5:
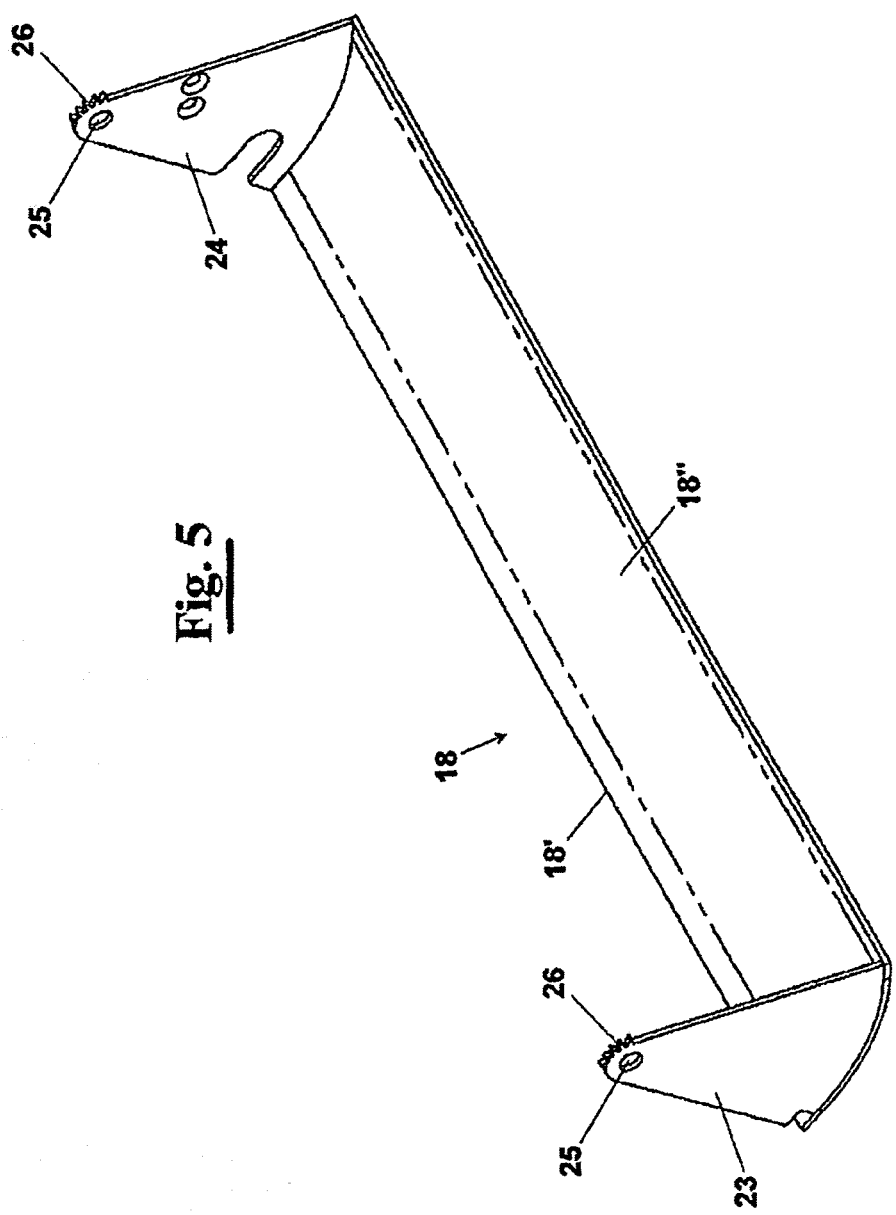
FIG. 5 is a prospective view of a portion of the compacting device as seen from direction 5 of FIG. 4, and in particular of a support member according to the invention for supporting the waste object to be compacted. The support member of FIG. 5 is shown disassembled from the compacting device.
Figure 7:
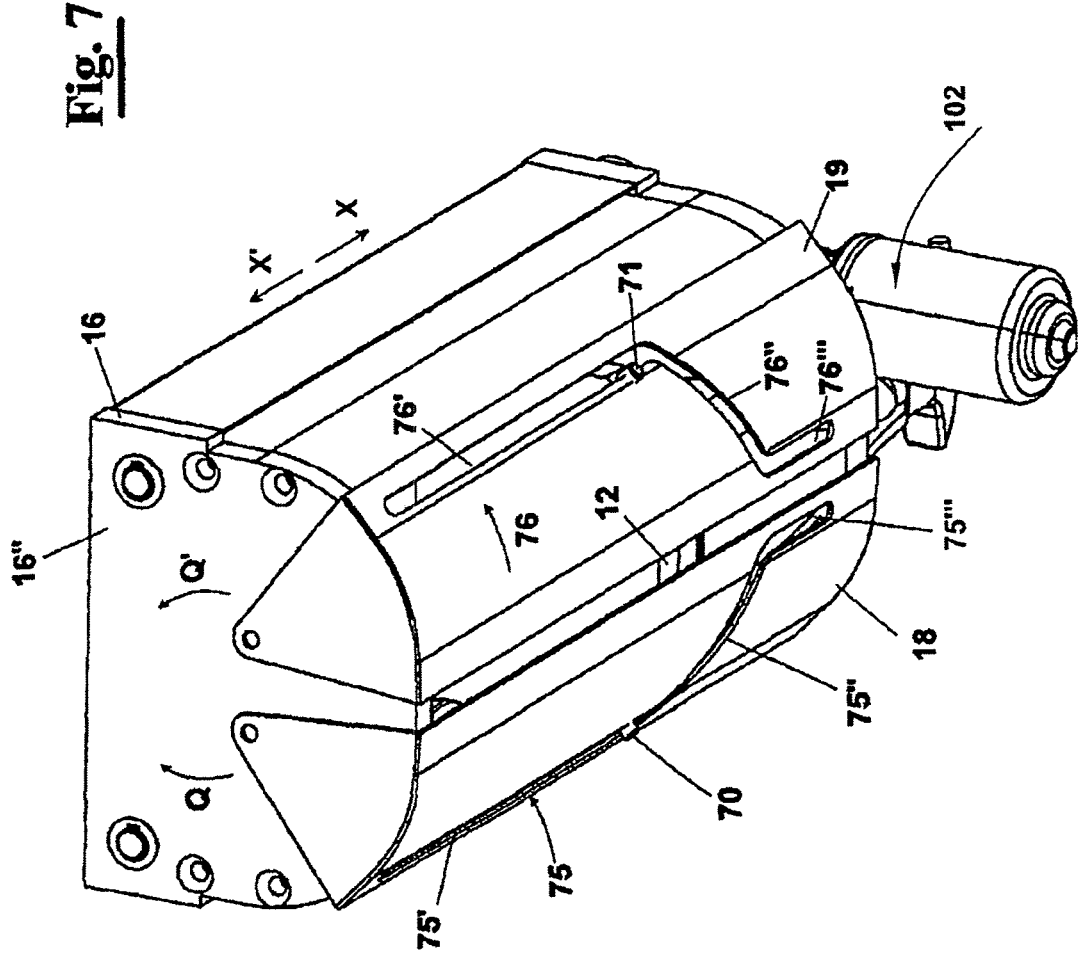
FIG. 7 is a prospective view of a portion of the compacting device as seen from direction 7 of FIG. 4, in which the support members of the object to be compacted are moved by means of a device which is different with respect to the device illustrated in FIGS. 4 and 6.

Each support member 18 and 19 is provided with arms, indicated with 23 and 24, that are placed at the ends of the support members 18 and 19, as shown in FIGS. 5, 6, and 7. The arms can be hinged in support pins that are seated in bores 25 (see FIGS. 5 and 7). The support pins can be fixed to the external surface 13" of the end plate 13 and to the external face 16" of the end plate 16.

In particular, the pins of two adjacent arms 23 and 24, which are at end of support members 18 and 19, are positioned on plate 13 in the positions indicated with 23' and 24' of the face 13" behind gear 32 (see FIG. 6). The pins on the external face 16" of plate 16 are opposite to the positions indicated with 23' and 24' so that edges 18' and 19' can result parallel and aligned with the longitudinal axis 10' of seat 10 when the support members 18 and 19 are assembled for rotating and forming aperture P (see FIGS. 2 and 3).

With arms 23 and 24 that are hinged as it has been described above, gears 26 which are concentric with bores 25 (see FIG. 5) and fixed to arms 23 and 24 of the support member 18, engage identical gears 26 which are concentric with bores 25 and fixed to arms 23 and 24 of the support member 19.

In this way, the transmission of opening and closing rotations R and R' of arms 23 and 24 occurs through gears for progressively forming and closing aperture P. Furthermore, a synchronous transmission occurs between members 18 and 19 due to the engagement of gears 26.

Support member 18 is fixed to a gear member 28 (see FIG. 6) by means of screws in bores 28'. Gear member 28 engages a gear sector 29, which is supported for rotation together with a motor shaft (see FIG. 4) housed in bore 29'.

The motor shaft housed in bore 29' belongs to motor 30, which is fixed to plate 31 (see FIG. 4). To illustrate the parts of FIG. 6, plate 31 has been disassembled with respect to the assembly condition shown in FIG. 4.

Rotation of motor 30 in direction R' causes support members 18 and 19 to rotate around pins which are received in bores 25 and therefore support members 18 and 19 to open for reaching the condition shown in FIG. 3. The rotation of motor 30 in the opposite direction R causes the support members 18 and to close for reaching the condition shown in FIGS. 2,4 and 6.

The rotations R and R' of motor 30 causes direct rotation of support member 18, whilst the gears 26 described above transmit synchronous rotations of motor 30 from support member 18 to support member 19.

The gear train shown in FIG. 6, consisting of gears 32, 33, 34, 35, 36 transmits synchronous rotations from reduction gear 102 (see FIGS. 4 and 6) to screws 14 and 15 for the translation of member 12 in directions X and X'. In fact, the output shaft of the reduction gear 102 engages the central bore of gear 32 (see FIGS. 4 and 6). Gears 35 and 36 are coupled respectively to the ends of screws 14 and 15.

As shown in FIG. 6, intermediate gears 33 and 34 have the same number of teeth in order to guarantee transmission of synchronous rotation to screws 14 and 15 from reduction gear 102.

End path switches 41 and 41' are fixed to plate 13 and are connected to control unit 103 of the compacting device for monitoring the end positions reached by the gear sector 29. In this way control unit 103 determines when a complete aperture or a complete closure of support members 18 and 19 is reached for allowing further operation sequences of the device.

In FIG. 7 support members 18 and 19 are moved by using a device that is different from motor 30 and gear members 28 and 29.

In fact, FIG. 7 shows a support assembly where members 18 and 19 are provided with respective channels 75 and 76 which are engaged respectively by pins 70 and 71 that are integral with push member 12.

In the solution of FIG. 7, the movement of push member 12 in direction X' is used for compacting the objects against the end walls of wall 16. During compacting, pins 70 and 71 run with a surface engagement in stretches 75' and 76' of channels 75 and 76, whilst in the return movement of push member 12 in direction X' the pins run with surface engagement in stretches 75", 76", 75''', 76'''. Running of the pins along stretches 75", 76", 75''', 76''' 'causes the support members 18 and 19 to rotate respectively in direction Q and Q' to form aperture P, as shown in FIG. 3.

Figure 8:
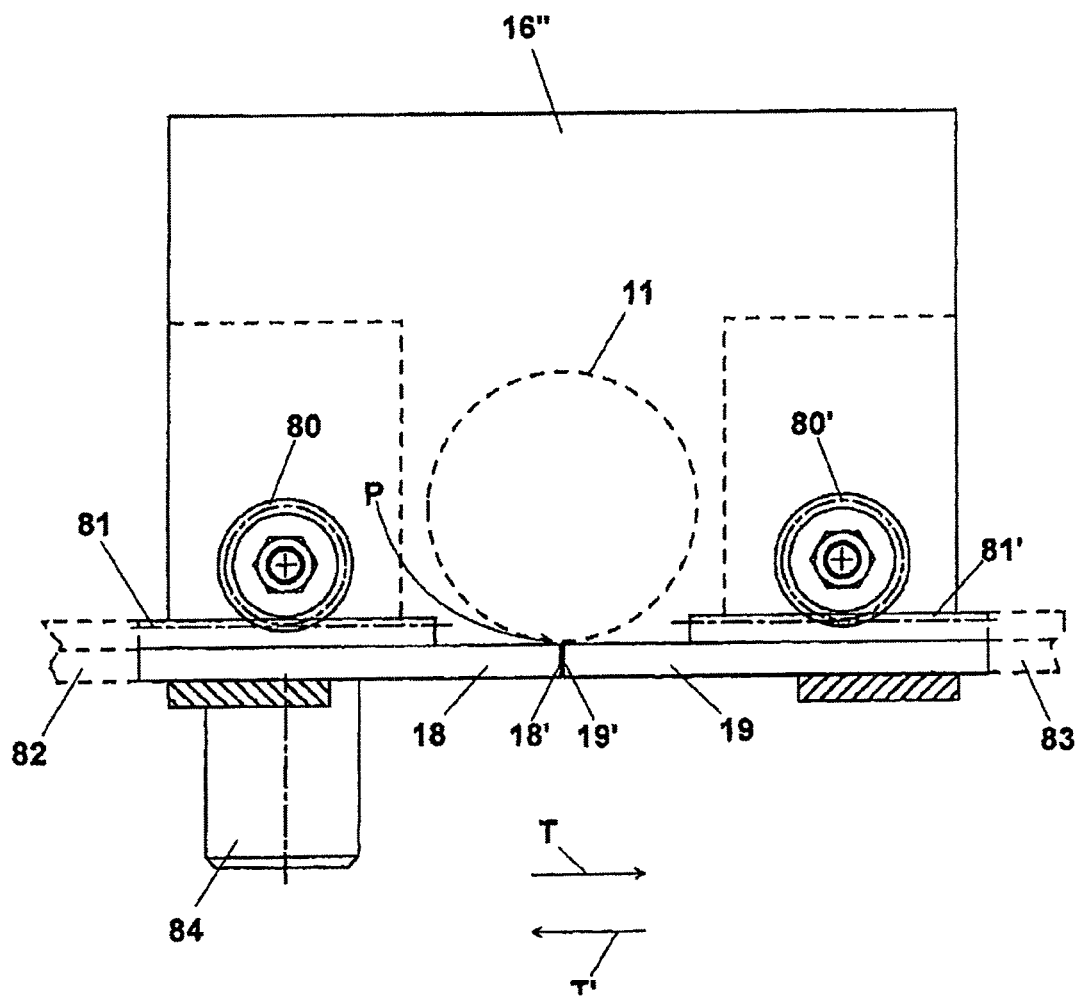
FIG. 8 is a partial view from direction 8 of FIG. 1 of an alternative solution of the support members for supporting the object to be compacted.

With reference to the solution of FIG. 8, parts are visible because plate 54 has been disassembled in comparison with the assembly conditions of FIG. 3.

The alternative solution of FIG. 8 provides a support assembly with support members 18 and 19 having a planar configuration, which are moved by motor 84 and gears 80 and 80' in the horizontal directions T and T'. Gears 80 and 80' respectively engage sectors 81 and 81' of support members 18 and 19. In this way the distance separating edges 18' and 19' is increased, thereby aperture P is opened or closed for discharge of the compacted object.

FIGS. 1, 2 and 3 illustrate a distributor of heated air 105 located on one side of object 11 when it is positioned in seat 10. In this situation portions 18" and 19" of support members 18 and 19 for supporting the object are positioned on the opposite side of the object 11.

The heated air is distributed around the object (see arrows 60' in FIGS. 2 and 3) and along direction X or X' for compacting object 11. The hot air heats the object to be compacted up to a temperature which reduces the resistance to compression of object 11 in order to ease the compaction and maintaining a compacted configuration within seat 10.

Object 11 results aligned with the distributor of heated air 105 when seat 10 is in the operation position B within frame 50. In this situation, distributor 105 results positioned above seat 10 and extends along the object as shown in FIGS. 1, 2 and 3.

The air can be fed by a ventilator 106 (see FIG. 1 connected by means of tubing 107 to distributor 105. An electric resistance 108 present within the distributor 60 can be used to heat the air.

With reference to FIG. 9C, push member 12 and end wall 13 is provided with protuberances 110. Protuberances 110 have a major extension dimension in a direction 113 (see FIG. 9E), which is parallel to the push plane of member 12.

Protuberances 110 preferably extend perpendicular to axis 10' and can be provided with sharpened ends 110' (see FIG. 9E). A certain number of protuberances are placed at constant distances from each other as shown in FIGS. 9C and 9D. The protuberances of push member 12 can be aligned with spacing 116 separating the protuberances of end wall 13 as shown in FIGS. 9C and 9D.

Neck and top 111 of bottle 11 can be seated in a recess 112 of push member 12.

FIG. 9D shows the compaction result after push member 12 has moved in direction 115 to an end position towards end wall 13. In this situation, ends 110' apply high pressure on specific areas of the compacted object 11'. The pressure can be such that a depression 114 is caused on the compacted object 11' where ends 100' are in contact, as shown in the FIG. 9D. The material forming the sides of the depression undergoes a permanent deformation, therefore there is no elastic return of the material in these areas of compacted object 11'. The distribution of the depressions along compacted object 11' avoids that compacted object 11' tends to loose the compact condition once the pressure applied by push member 12 is removed. In other words object 11 tends to remain in the compact size shown in FIG. 9D instead of opening in directions 117 and 117'.

Members 120 can be located in a spacing existing between protuberances of push member 12 and protuberances of end wall 13, as shown in FIGS. 9C, 9D and 9E. Members 120 may have the form of curvilinear plate beams made of elastic material with convexity facing the object being compacted. Members 120 become deformed during compaction by being pressed against the surface of the object being compacted in the areas adjacent to depressions 114.

When the compression action of push member 12 is removed by moving push member 12 away from end wall 13, members 120 elastically react and return to their original configuration. The return motions of members 120 to their original configuration obtain that members 120 push compacted object 11' away from push members 12, or from end wall 13, and therefore unwanted attachment of compacted object 11' on push members 12, or on end wall 13 is avoided. This attachment can be due to adherence of the compacted object 11' on the surfaces of protuberances 110. The adherence can impede discharge of the compacted object in a container like 20 or 20' when support members 18 and 19 are moved to form the discharge aperture (P). Protuberances 110 and members 120 can be assembled on slides 118 and 119 which are assembled in a removable manner respectively on push member 12 and end wall 13 in direction towards and away from the observer viewing FIGS. 9C and 9D, i.e. parallel to direction Z (see FIG. 1). This assembly solution facilitates changing the size and position of the protuberances on push member 12 and end wall 13 to optimize forming the depressions based on the size and nature of the container 11 that needs to be compacted.

The foregoing description of the specific embodiments will so fully reveal the invention according to the conceptual point of view, so that others, by applying current knowledge, will be able to modify and/or adapt for various applications such embodiments without further research and without departing from the invention, and it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus for compacting waste objects comprising:
   a seat that is defined by end walls for containing a waste object to be compacted, the seat having a length;
   a support assembly of the seat, the support assembly adapted to support a waste object to be compacted, and to be opened to discharge the waste object, wherein:
      the support assembly comprises support members that extend along the length of the seat,
      the support members are arranged to rotate to a discharge position for discharging the compacted object, and
      the support members occupy positions adjacent the sides of the seat that are parallel to the length of the seat in the discharge position;
   a push member that is moveable inside the seat for compacting, in use, the waste object against an end wall of the seat to obtain a compacted object;
   a frame having a fixed structure for supporting the seat; and
   a carriage for moving the seat on the fixed structure from a first position that is totally or partially outside the frame, such that, in use, the waste object to be compacted is placed in the seat when the seat is in said first position, to a second position that is within the frame, where, in use, compacting of the waste object and discharge of the compacted object into a collection container occur;
   wherein the collection container is aligned with the seat in said second position; and
   wherein the collection container is configured to move via a panel from the first position to the second position.

2. The apparatus according to claim 1, wherein when the seat is in the first position the waste object to be compacted is loaded in the seat in a vertical direction.

3. The apparatus according to claim 1 wherein the seat and the collection container are configured to be assembled as a unit on the carriage to be translated together between the first position and the second position.

4. The apparatus according to claim 1 wherein the push member is adapted to compress waste objects of a first type against an end wall of the seat and waste objects of a different type against a second end wall of the seat.

5. The apparatus according to claim 2 wherein the loading in the vertical direction is not impeded by overhead structures present with respect to the frame.

6. The apparatus according to claim 1 wherein the collection container is arranged to be removed from the carriage when the collection container is in the first position.

7. The apparatus according to claim 1 wherein the support assembly is arranged to be moved from a support position, in which the support assembly supports the waste object, to a discharge position, in which the support assembly discharges a compacted object of a first type; wherein the support assembly impedes the discharge of a compacted object of a second type through an aperture formed by the support assembly during its moving to said discharge position; and a second collection container for collecting compacted objects of the second type.

8. The apparatus according to claim 7 further comprising a third collection container for collecting compacted objects of a third type, wherein the seat extends above the first collection container and the third collection container; wherein the first collection container is aligned with a portion of a length of the seat adjacent a first end wall of the seat in order to collect compacted objects of the first type and the third collection container is aligned with a portion of the length of the seat adjacent a second end wall of the seat in order to collect compacted objects of the third type.

9. The apparatus according to claim 7 wherein the second collection container for the compacted objects of the second type is aligned laterally with respect to the seat when positioned in the first position.

10. The apparatus according to claim 1 wherein the push member is arranged to be moved in the seat in a first direction for compacting the waste object against an end wall of the seat; and wherein protuberances are provided applied to the push member and to the end wall of the seat for producing depressions in the compacted object; and wherein the protuberances have a major extension dimension in a second direction that is parallel to a plane perpendicular to the first direction.

11. The apparatus according to claim 1, further comprising an air distributor arranged to convey heated air, the air distributor being located on one side of the seat and wherein a portion of a support member for supporting the waste object is positioned on another side of the seat opposite to the air distributor, such that the waste object is arranged, in use, between the air distributor and the support member.

12. The apparatus according to claim 11 wherein the air distributor is configured to distribute heated air both around the waste object and along a direction that is used by said push member for moving to compact the waste object.

* * * * *